US 7,681,037 B2

(12) United States Patent
Yoshida

(10) Patent No.: US 7,681,037 B2
(45) Date of Patent: Mar. 16, 2010

(54) NETWORK CONNECTION SYSTEM

(75) Inventor: Takeo Yoshida, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 908 days.

(21) Appl. No.: 10/790,082

(22) Filed: Mar. 2, 2004

(65) Prior Publication Data

US 2004/0177248 A1 Sep. 9, 2004

(30) Foreign Application Priority Data

Mar. 5, 2003 (JP) ............................ 2003-059162
Feb. 12, 2004 (JP) ............................ 2004-035481

(51) Int. Cl.
G06F 7/04 (2006.01)
G06F 15/16 (2006.01)
G06F 17/30 (2006.01)
H04L 29/06 (2006.01)
H04N 7/16 (2006.01)
H04L 9/32 (2006.01)
G06F 21/00 (2006.01)
H04L 9/00 (2006.01)
B41K 3/38 (2006.01)
H04L 9/08 (2006.01)

(52) U.S. Cl. ............................ 713/168; 726/3; 726/26; 713/153; 713/155; 713/182; 380/44; 380/59; 380/278

(58) Field of Classification Search ................. 713/186, 713/168–171, 181–184, 153, 155; 726/2, 726/3, 11, 12, 16, 17, 21, 8, 26, 27; 380/44, 380/45, 59, 277, 278, 283–285

See application file for complete search history.

(56) References Cited

U.S. PATENT DOCUMENTS

| 5,349,642 | A | * | 9/1994 | Kingdon | ...................... 713/161 |
| 5,671,354 | A | * | 9/1997 | Ito et al. | ......................... 726/3 |
| 5,898,780 | A | * | 4/1999 | Liu et al. | ..................... 713/155 |
| 6,081,900 | A | * | 6/2000 | Subramaniam et al. | ........ 726/19 |
| 6,105,132 | A | * | 8/2000 | Fritch et al. | ................. 713/167 |
| 6,253,327 | B1 | * | 6/2001 | Zhang et al. | .................. 726/14 |
| 6,301,661 | B1 | * | 10/2001 | Shambroom | ................ 713/168 |
| 6,311,275 | B1 | * | 10/2001 | Jin et al. | ........................ 726/12 |
| 6,324,648 | B1 | * | 11/2001 | Grantges, Jr. | ................. 726/12 |
| 6,463,474 | B1 | * | 10/2002 | Fuh et al. | ..................... 709/225 |
| 6,971,005 | B1 | * | 11/2005 | Henry et al. | ................. 713/155 |
| 7,069,433 | B1 | * | 6/2006 | Henry et al. | ................. 713/151 |
| 7,233,997 | B1 | * | 6/2007 | Leveridge et al. | ........... 709/229 |
| 7,350,229 | B1 | * | 3/2008 | Lander | ........................ 726/8 |
| 2003/0163691 | A1 | * | 8/2003 | Johnson | ..................... 713/168 |

FOREIGN PATENT DOCUMENTS

JP        A 8-235114         9/1996
KR        2002-0055848 A     7/2002

* cited by examiner

*Primary Examiner*—Nasser Moazzami
*Assistant Examiner*—Oscar A Louie
(74) *Attorney, Agent, or Firm*—Oliff & Berridge, PLC

(57) ABSTRACT

A network connection system includes a client apparatus, an authentication server, and a connection server. The authentication server authenticates a user of the client apparatus and transmits a network address of the client apparatus to the connection server. When information indicating the transition to a connection wait state is received from the connection server, the network address of the connection server is transmitted to the client. The client apparatus transmits an encrypted user name and password to the network address. The connection server 11 conducts authentication using the encrypted user name and password.

11 Claims, 4 Drawing Sheets

FIG. 2

| NETWORK ADDRESS OF CONNECTION SERVER | FIRST ENCRYPTED USER NAME | FIRST ENCRYPTED PASSWORD |
|---|---|---|
| aaaaa | bbbb | ccccc |
| aaaaa | ddddd | eeeee |
| fffff | ggggg | hhhhh |
| aaaaa | xxxxxx | yyyyy |
| ⋮ | ⋮ | ⋮ |

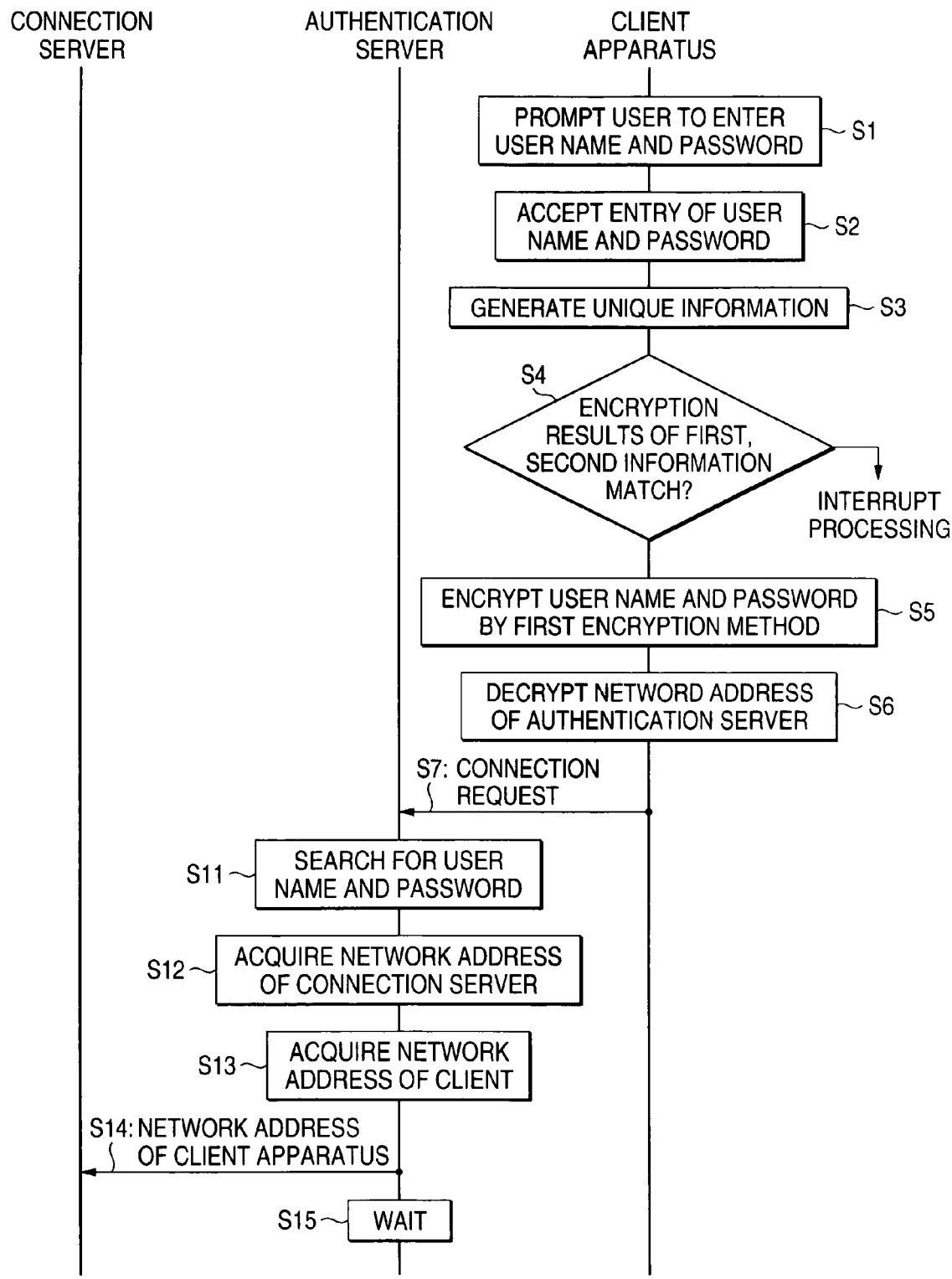

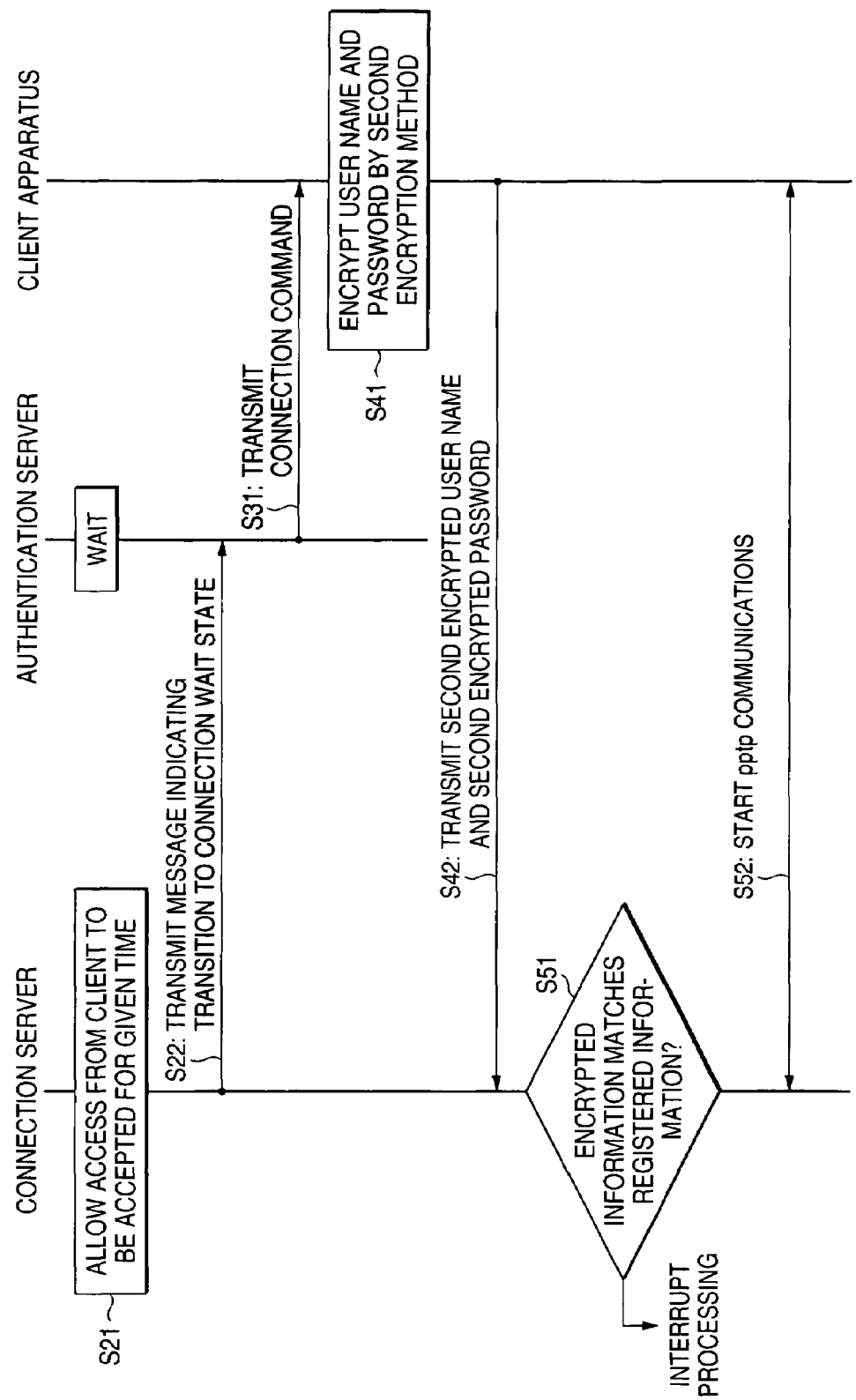

NETWORK CONNECTION SYSTEM

The present disclosure relates to the subject matter contained in Japanese Patent Application No. 2003-059162 filed on Mar. 5, 2003, which is incorporated herein by reference in its entirety.

BACKGROUND OF THE INVENTION

1. Field of the Invention

The present invention relates to a network connection system for making it possible to connect to a local network, etc., from a remote location.

2. Description of the Related Art

In recent years, the variety of working styles of workers has been increasing in cooperation with the widespread use of Internet connection environment. For example, so-called telecommuting-type working style for the worker to work at home while belonging to an enterprise is easily accepted, because development of remote access service (RAS) technology for accessing a local area network in an enterprise via a network shared by different users, such as the Internet and a public telephone network, from a remote location of user's home, etc., has moved forward.

In such a remote access service, it is the common practice to perform authentication on the local network side based on the user name and the password previously registered in the local network and encrypt traffic after authentication on the network (midway network) between the remote location and the accessed local network to prevent information used in the enterprise from being freely referenced.

JP-A-Hei. 8-235114 discloses an art for each terminal to acquire information required for connecting to a server from an intermediate server for the purpose of providing a system for enabling even a terminal not holding user authentication information of a plurality of servers to access the servers and managing collectively charging for the servers.

However, in the remote access service in the related art described above, the traffic after authentication is encrypted, but authentication information of the user name, etc., is distributed as it is. Therefore, if the user name is illegally gained in a midway network, it is made possible to make unauthorized access wherein the illegally gained user name is sent to the local network side for attacking at random as the password.

SUMMARY OF THE INVENTION

It is therefore an object of the invention to provide a network connection system that can improve security in remote access.

To solve the problems in the related art example, according to a first aspect of the invention, a network connection system includes a client apparatus, an authentication server, and a connection server. The authentication server includes a retention unit for storing second connection authentication information prepared on the basis of first connection authentication information used in the connection server while associating the second connection authentication information with a connection server address, a first unit for acquiring user identification information from the client apparatus and a client address when the first unit receives a connection request from the client apparatus, and a second unit for transmitting the acquired client address to the connection server having the connection server address associated with the second connection authentication information and transmitting the connection server address to the client apparatus, which has transmitted the connection request. The client apparatus includes a third unit for transmitting the second connection authentication information to the authentication server as the user identification information together with the connection request, a fourth unit for receiving the connection server address from the authentication server, and a fifth unit for transmitting the first connection authentication information to the connection server having the received connection server address. The connection server includes a sixth unit for receiving connection from the client address, which has been received from the authentication server, and a seventh unit for performing an authentication process by using the first connection authentication information transmitted from the client address.

The second connection authentication information may be a message digest of the first connection authentication information.

To solve the problems in the related art example, according to a second aspect of the invention, an authentication server is connected to a client apparatus and a connection server. The authentication server includes a retention unit for storing second connection authentication information prepared on the basis of first connection authentication information used in the connection server while associating the second connection authentication information with a connection server address, a first unit for acquiring user identification information from the client apparatus and a client address when the first unit receives a connection request from the client apparatus, and a second unit for transmitting the acquired client address to the connection server having the connection server address associated with the second connection authentication information and transmitting the connection server address to the client apparatus, which has transmitted the connection request.

To solve the problems in the related art example, according to a third aspect of the invention, a client apparatus is connected to an authentication server and a connection server. The client apparatus includes a connection request unit for transmitting a connection request and second connection authentication information prepared on the basis of first connection authentication information used in the connection server to the authentication server, and a unit for receiving a connection server address from the authentication server to transmit the first connection authentication information to the connection server address.

To solve the problems in the related art example, according to a fourth aspect of the invention, a connection server is connected to an authentication server and a client apparatus. The connection server includes a control unit for receiving a client address from the authentication server and allowing connection from the client address, and an authentication unit for receiving authentication information from the client apparatus having the client address, which is allowed the connection, to perform an authentication process by using the authentication information.

In a network connection system including a client, according to a fifth aspect of the invention, a network connection system includes a client apparatus, an authentication server and a connection server. The authentication server includes a retention unit for storing a first encrypted user name and a first encrypted password, which are encrypted by a first encryption method, while associating a connection server address with the first encrypted user name and the first encrypted password, a first unit for acquiring the first encrypted user name and the first encrypted password as identification information for identifying a user of the client apparatus, and a client address when the first unit receives a connection request from the client apparatus, and a second unit for transmitting the acquired client address to the connection server address associated with the user identification information when the retention unit stores the user identification information, receiving from the connection server information indicating that the connection server is shifted to a connection wait state, and transmitting the connection server address to the client apparatus, which issues the connection request. The client apparatus includes a third unit for transmitting to the authentication server the first encrypted user name and the first encrypted password, which are encrypted by the first encryption method, together with the connection request, and a fourth unit for receiving the connection server address from the authentication server, and transmitting to the received connection server address a second encrypted user name and a second encrypted password, which are generated by encrypting a user name and a password, which are input by the user, by a second encryption method.

Thus, the user of the client cannot know the network address of the connection server until the user is authenticated in the authentication server. Further, the user name, etc., sent to the authentication server and the connection server is encrypted by the first and second encryption methods, for example, encrypting based on a hash function and encrypting given random information with the user name, etc., as a key, so that the user name, etc., can be prevented from being leaked and the security can be improved. The first and second encryption methods may be different from each other or may be the same.

To solve the problems in the related art example, according to a sixth aspect of the invention, an authentication server is connected to a client apparatus and a connection server. The authentication server includes a retention unit for storing a user name and a password, which are encrypted by a predetermined method, while the user name and the password are associated with a connection server address, a first unit for acquiring the encrypted user name and the encrypted password as identification information for identifying a user of the client apparatus, and a client address when the first unit receives a connection request from the client apparatus, and a second unit for transmitting the acquired client address to the connection server address associated with the user identification information when the retention unit stores the user identification information, receiving from the connection server information indicating that the connection server is shifted to a connection wait state, and transmitting the connection server address to the client apparatus, which issues the connection request.

To solve the problems in the related art example, according to a seventh aspect of the invention, a client apparatus is connected to an authentication server and a connection server. The client apparatus includes a connection request unit for transmitting to the authentication server a user name and a password, which are encrypted by a first encryption method, together with a connection request, and a unit for receiving a connection server address from the authentication server, encrypting a user name and a password, which are input by a user, by a second encryption method, and transmitting the user name and the password, which are encrypted by the second encryption method, to the received connection server address.

Here, the client apparatus may further includes a retention unit for storing local authentication information, which is previously supplied from the connection server, as information associating unique information of the client apparatus with at least one of the user name and the password, and a local authentication unit for generating the unique information upon receiving inputting the user name and the password by the user, references the local authentication information to authenticate the user by judging whether or not at least one of the received user name and the received password is associated with the generated unique information. The connection request unit may transmit to the authentication server the user name and the password, which are encrypted by the first method, together with the connection request only when the local authentication unit authenticates the user.

To solve the problems in the related art example, according to an eighth aspect of the invention, a connection server is connected to a client apparatus and an authentication server. The connection server includes a unit for receiving an address of the client apparatus to be connected from the authentication server, allowing communication from the address for a predetermined period, and transmitting to the authentication server information indicating that the connection server is shifted to a connection wait state.

Further, to solve the problems in the related art example, according to a ninth aspect of the invention, a network connection system includes a client apparatus, an authentication server for supplying information guiding a connection destination to the client apparatus, and a connection server. The client apparatus calculates first authentication information unique to the client apparatus to register the first authentication information in the connection server preliminarily, and acquiring local authentication information associating the first authentication information with a predetermined second authentication information from the connection server to store the local authentication information. The client apparatus receives input of the second authentication information when a user instructs a connection request with respect to the connection server, calculates the first authentication information unique to the client apparatus again, looking into an association between the input second authentication information and the again calculated first authentication information by using the stored local authentication information, encrypting the second authentication information by a first encryption method to transmit to the authentication server the second authentication information encrypted by the first encryption method when it is concluded that the association is established. The client apparatus receives the connection server address as the information guiding the connection destination from the authentication server, transmitting the second authentication information encrypted by a second encryption method to a connection server address, and starting a communication with the connection server.

According to a tenth aspect of the invention, a connection method uses a network connection system including a client apparatus, an authentication server, and a connection server. The method includes storing by the authentication server second connection authentication information prepared on the basis of first connection authentication information used in the connection server while associating the second connection authentication information with a connection server address, transmitting by the client apparatus to the authentication server the second connection authentication information as user identification information together with a connection request, acquiring the user identifying information from the client apparatus and client address when the authentication server receives the connection request from the client apparatus, transmitting the acquired client address to the connection server identified by the connection server address associated with the second connection authentication information when the user identification information meets the second connection authentication information, transmitting the connection server address to the client apparatus, which issues the connection request, receiving by the client apparatus the connection server address from the authentication server, transmitting by the client apparatus the first connection authentication information to the received connection server address, receiving by the connection server connection from the client address received from the authentication server, and performing an authentication process by using the first connection authentication information transmitted from the client address.

Further, according to an eleventh aspect of the invention, a connection method uses a network connection system including a client apparatus, an authentication server, and a connection server. The method includes storing by the authentication server a user name and a password, which are encrypted by a first encryption method, while associating the encrypted user name and the encrypted password with connection server address, transmitting by the client apparatus to the authentication server the user name and the password, which are encrypted by the first encryption method, together with a connection request, receiving by the authentication server the connection request from the client apparatus, acquiring the user name and the password, which are encrypted by the first encryption method, as information identifying a user of the client apparatus, and a client address, transmitting the acquired client address to the connection server address associated with the information identifying the user when the authentication server stores the information identifying the user, receiving by the connection server the client address of the client apparatus to be connected from the authentication server, allowing communication from the client apparatus, transmitting to the authentication server information indicating that the connection server is shifted to a connection wait state, encrypting a user name and a password, which are input by the user, by a second encryption method, transmitting the user name and the password, which are encrypted by the second encryption method, to the connection server address received by the client server from the authentication server, and performing an authentication process by using the user name and the password, which are encrypted by the second encryption method and are received by the connection server from the client apparatus.

To solve the problems in the related art example, according to the invention, there is provided a program executed by an authentication server connected to a client and a connection server for causing the authentication server to execute the steps of retaining second connection authentication information generated based on first connection authentication information used in the connection server in association with information identifying the connection server; upon reception of a connection request from the client, for acquiring information identifying the user from the client and acquiring the current network address used by the client as a client address; and if the user identification information matches the second connection authentication information, for transmitting the acquired client address to the connection server identified by the information associated with the second connection authentication information and sending a network address of the connection server to the client transmitting the connection request.

To solve the problems in the related art example, according to the invention, there is provided a program executed by a client connected to an authentication server and a connection server for causing the client to execute the steps of transmitting a connection request together with second connection authentication information generated based on first connection authentication information used in the connection server to the authentication server; and receiving an address of the connection server from the authentication server and transmitting the first connection authentication information to the received address of the connection server.

To solve the problems in the related art example, according to the invention, there is provided a program executed by a connection server connected to an authentication server and a client for causing the connection server to execute the steps of receiving a client address of the client from the authentication server and controlling so as to make connection from the client address acceptable; and receiving authentication information from the client using the client address made acceptable and conducting authentication using the authentication information.

To solve the problems in the related art example, according to the invention, an authentication server connected to a client and a connection server is caused to execute the steps of retaining a user name and a password encrypted by a predetermined method in association with a network address of the connection server; upon reception of a connection request from the client, for acquiring the encrypted user name and password as information identifying the user of the client and acquiring the current network address used by the client as a client address; and if the user identification information is retained in the retention means, for transmitting the acquired client address to the network address of the connection server associated with the user identification information, receiving information indicating a transition to a connection wait state from the connection server, and sending the network address of the connection server to the client making the connection request.

Further, to solve the problems in the related art example, according to the invention, a client connected to an authentication server and a connection server is caused to execute the steps of transmitting a connection request together with a user name and a password encrypted by a first encryption method to the authentication server; and receiving a network address of the connection server from the authentication server, encrypting a user name and a password entered by the user by a second encryption method, and transmitting the user name and the password encrypted by the second encryption method to the received network address.

Further, to solve the problems in the related art example, according to the invention, a connection server connected to a client and an authentication server for conducting encrypted communications with the client is caused to execute the step of receiving notification of a client address of an address of the client to connect, setting so that communications from the client address are made acceptable only for a predetermined time, and transmitting information indicating a transition to a connection wait state to the authentication server.

BRIEF DESCRIPTION OF THE DRAWINGS

FIG. 2 is a schematic representation to represent an example of data stored in an authentication server.

FIG. 3 is a flowchart to represent an example of a flow of the first half of network connection according to the embodiment of the invention.

FIG. 4 is a flowchart to represent an example of a flow of the latter half of network connection according to the embodiment of the invention.

DETAILED DESCRIPTION OF THE PREFERRED EMBODIMENTS

Figure 1:
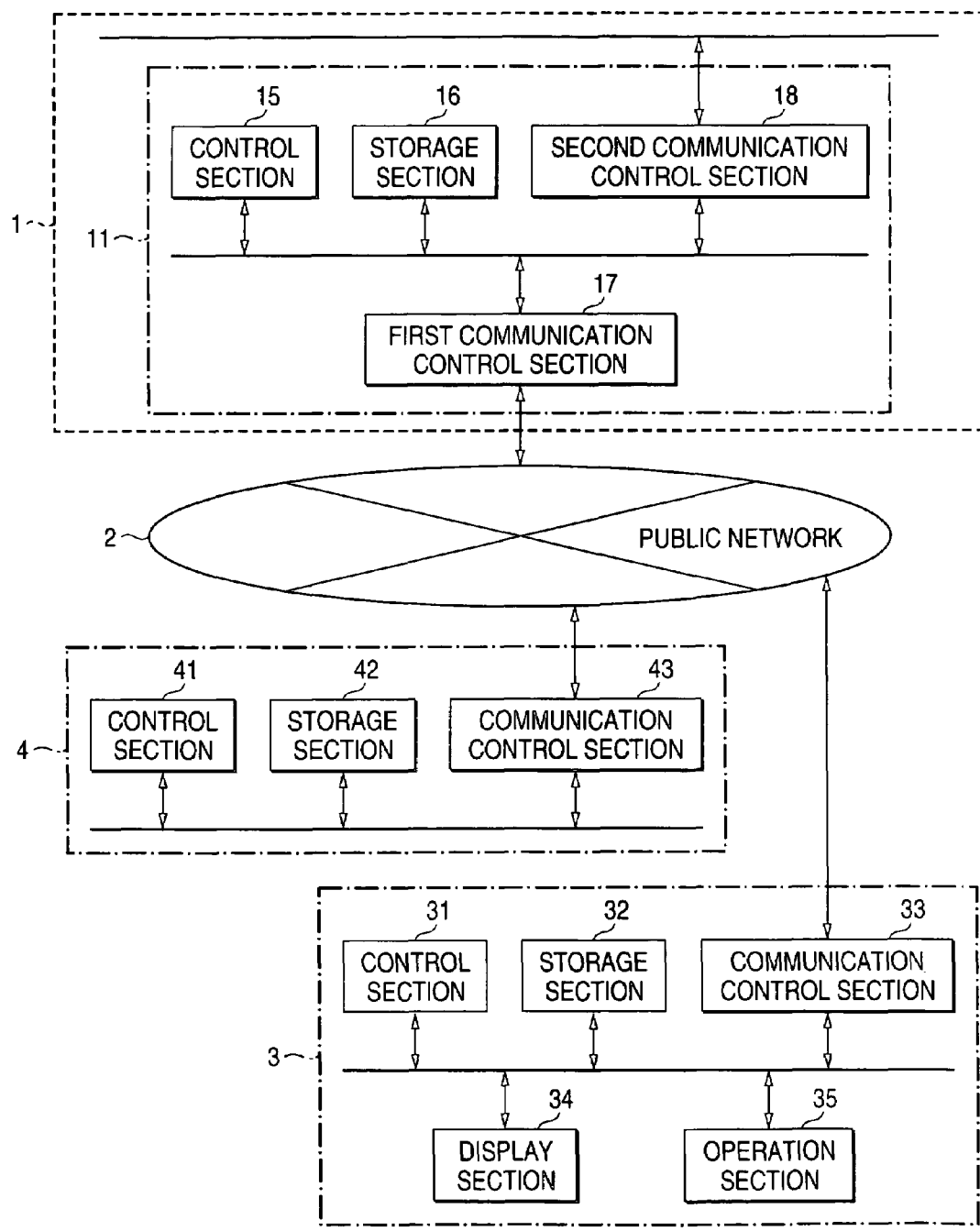
FIG. 1 is a block diagram to represent an example of a network connection system according to an embodiment of the invention.

Referring now to the accompanying drawings, a preferred embodiment of the invention will be described. A network connection system according to an embodiment of the invention includes a local network 1, a public network 2, a client 3 connected to the public network 2, and an authentication server 4. The local network 1 is connected to the public network 2 through a connection server 11. The public network 2 is a network system made up of the Internet, a public switched telephone network, etc. Although only one authentication server 4 is shown in FIG. 1, two or more authentication servers 4 may be included.

The client 3 is a general personal computer and includes a control section 31, a storage section 32, a communication control section 33, a display section 34, and an operation section 35. The control section 31 operates in accordance with a program stored in the storage section 32 (client program). The control section 31 executes RAS connection processing to the local network 1. The RAS connection processing is described later specifically in detail. The storage section 32 is a computer-readable storage medium for storing programs, etc. The storage section 32 also operates as work memory of the control section 31.

The communication control section 33 transmits information to a destination specified by a network address contained in a command input from the control section 31 in accordance with the command. The communication control section 33 receives information coming through the network and outputs the information to the control section 31. The display section 34 is a display, etc., for displaying information in accordance with a command input from the control section 31. The operation section 35 is made up of a keyboard, a mouse, etc., and outputs the details of user's command operation to the control section 31.

The authentication server 4 is a general server computer and includes a control section 41, a storage section 42, and a communication control section 43. The control section 41 operates in accordance with a program stored in the storage section 42 (authentication server program) and performs authentication processing. The authentication processing is described later specifically in detail.

The storage section 42 is a computer-readable storage medium for storing programs, etc. The storage section 42 also operates as work memory of the control section 41. The communication control section 43 transmits information to a destination specified by a network address contained in a command input from the control section 41 in accordance with the command. The communication control section 43 receives information coming through the network and outputs the information to the control section 41.

The connection server 11 of the local network 1 may also be a general server computer and includes a control section 15, a storage section 16, a first communication control section 17, and a second communication control section 18. The control section 15 operates in accordance with a program stored in the storage section 16 (connection server program) and performs authentication processing, connection processing, and the like. The authentication processing and connection processing are described later specifically in detail.

The storage section 16 is a computer-readable storage medium for storing programs, etc. The storage section 16 also operates as work memory of the control section 15. The first communication control section 17 transmits information through the public network 2 to a destination specified by a network address contained in a command input from the control section 15 in accordance with the command. The first communication control section 17 receives information coming through the public network 2 and outputs the information to the control section 15. The second communication control section 18 transmits information through the local network 1 to a destination specified by a network address contained in a command input from the control section 15 in accordance with the command. The second communication control section 18 receives information coming through the local network 1 and outputs the information to the control section 15.

The control section 15 of the connection server 11 transfers a data request, etc., received through the first communication control section 17 from the client 3 authenticated by a method described later to the local network 1 through the second communication control section 18. The control section 15 accepts data, etc., to be transmitted from the local network 1 to the client 3 through the second communication control section 18 and transmits the data, etc., through the first communication control section 17.

[Setup]

Here, the authentication processing performed among the client 3, the authentication server 4, and the connection server 11 will be discussed. First, a setup procedure until it is made possible for the client 3 to make RAS connection through the connection server 11 will be discussed. In the description that follows, communications between the client 3 and the authentication server 4 may be encrypted by a method of SSL (Secure Socket Layer), etc., widely known.

One of the features of the embodiment is that application software dedicated to RAS connection is installed in the client 3. The dedicated application software holds the encrypted network address of the authentication server 4 and causes the client 3 to execute a procedure of decrypting the encrypted network address of the authentication server 4. The client 3 can virtually access the authentication server 4 only by using the dedicated application software.

Next, a setup procedure of the dedicated application software will be discussed. When the dedicated application software is installed in the client 3, the client 3 computes unique information to the client 3 as first authentication information unique to the client 3 on the basis of information generally varying from one client 3 to another such as hardware-relevant information of the serial number of hard disk constructing the client 3 and information concerning the software environment such as the version of the operating system.

The user transfers the unique information and information of the user name, the password, etc., to the administrator of the connection server 11. The information transfer method, for example, may be encrypted electronic mail or may use transfer means using a magnetic disk, etc. The administrator of the connection server 11 registers the unique information, the user name, and the password in the connection server 11. When they are registered in the connection server 11, the connection server 11 selects the authentication server 4 for authenticating the user, encrypts the network address of the selected authentication server 4 to generate an encrypted address, encrypts predetermined information (which may be any desired character string or may be meaningful information of the expiration date of RAS connection, etc.,) with the unique information as a key to generate first information, and encrypts the predetermined information with the user name as a key to generate second information. The connection server 11 outputs information containing the encrypted address, the first information, and the second information as definition information. The first information and the second information correspond to local authentication information for associating the first authentication information and second authentication information with each other. The definition information may contain at least a part of an encrypted password provided by encrypting the password in accordance with a first encryption method described later.

The definition information is delivered to the client 3 by any desired method such as electronic mail to the user of the client 3 and is stored in the storage section 32 of the client 3. The client 3 uses the definition information to check whether or not the unique information has been correctly registered in accordance with the dedicated application software. Specifically, the client 3 computes and generates the unique information, requests the user to enter the user name, and decrypts the first information with the generated unique information and the second information with the entered user name. The client 3 checks to see if the decryption results (if the first information and the second information are decrypted correctly, the decrypted results are the predetermined information mentioned above) match. If they match, the client 3 determines that the unique information has been correctly registered.

On the other hand, the connection server 11 transmits the network address assigned to the first communication control section 17 (public network address) and the user name and the password of the client 3 encrypted by the first encryption method to the authentication server 4. The encryption method for encrypting the user name and password (first encryption method) may be a method incapable of decrypting; a message digest may be used in such a manner that MD5 hash values, etc., for the user name and the password are used. The authentication server 4 associates the network address received from the connection server 1 and the user name and the password encrypted by the first encryption method with each other and stores them in the storage section 42, which is a retention unit, as shown in FIG. 2. The setup sequence is now complete.

[Authentication Processing]

Next, authentication processing performed when an actual connection request is made will be discussed with reference to FIGS. 3 and 4. When attempting to make RAS connection to the local network 1, the user starts the dedicated application software installed in the client 3. First, as shown in FIG. 3, the control section 31 of the client 3 displays a message for requesting the user to enter the user name and the password on the display section 34 in accordance with the dedicated application software (S1). When the user operates the operation section 35 to enter the user name and the password as second authentication information (also corresponding to first connection authentication information of the invention) (S2), the control section 31 computes and generates unique information as first authentication information (S3) and decrypts the first information with the generated unique information and the second information with the entered user name. The control section 31 checks to see if the decryption results match (S4). When they match, the control section 31 encrypts the user name and password entered at step S2 by the first encryption method (S5). The user name and password encrypted by the first encryption method correspond to the second connection authentication information of the invention. At this time, if the definition information contains at least a part of the encrypted password, whether or not at least the corresponding part of the password encrypted at step S5 and at least the part of the encrypted password contained in the definition information match is determined. When they do not match, the processing may be interrupted. As no comparison is made between the whole of one encrypted password and the whole of the other, the security is furthermore enhanced.

The control section 31 decrypts the network address of the authentication server 4 (S6) and transmits a connection request together with the first encrypted user name and the first encrypted password encrypted by the first encryption method at step S5 to the network address provided by the decryption (S7). If the decryption results do not match at step S4, the authentication processing is interrupted at the point in time.

One of the features of the embodiment is that whenever RAS connection is attempted, the unique information as the first authentication information is computed as shown at step S3 as processing of the dedicated application software. Accordingly, even if any other authentication information is leaked, generally if a different computer is used, different first authentication information is computed and RAS connection processing is interrupted.

The authentication server 4 receives the encrypted user name and password together with the connection request from the client 3 and references the storage section 42 to search for the encrypted user name and password (S11). If the encrypted user name and password are stored in the storage section 42, the authentication server 4 acquires the network address of the connection server 11 associated with the encrypted user name and password (S12). Incidentally, when the storage section 42 does not store the user name and password encrypted in S11 (when authentication with these encrypted user name and password is failed), the authentication server 4 skips the processing subsequent to S12 and terminates the processing.

The authentication server 4 also acquires the network address of the client 3 transmitting the connection request (client address) (S13). The authentication server 4 transmits the client address acquired at step S13 to the network address of the connection server 11 acquired at step S12 (S14) and waits until reception of information indicating the transition to a connection wait state from the connection server 11 (S15) This flow is to be continued to FIG. 4.

As shown in FIG. 4, upon reception of the client address from the authentication server 4, the connection server 11 allows access from the network address to be accepted only for a predetermined time (S21). Communications between the authentication server 4 and the connection server 11 may be conducted using a secure line such as a leased line or an encrypted communication line. Specifically, to make RAS connection with the client 3 using pptp (point-to-point tunneling protocol), a fire wall is set in the connection server 11 and when the network address of the client 3 is received from the authentication server 4, a pptp port (TCP port) is opened only for a given time (for example, 60 seconds). The connection server 11 transmits a message indicating the transition to the connection wait state to the authentication server 4 (S22).

Upon reception of the information indicating the transition to the connection wait state from the connection server 11, the authentication server 4 transmits a connection command to the client 3 (S31). Upon reception of the connection command, the client 3 encrypts the user name and password as the second authentication information by a second encryption method (S41) and transmits the second encrypted user name and the second encrypted password encrypted by the second encryption method to the connection server 11 as the user name and password in pptp (S42).

Herein, the connection command in the process S31 may include the network address of the connection server. In this case, it is not necessary to set the network address of the connection server 11 in the client 3 in advance. Also, in this case, the client 3 transmits the second encrypted user name and the second encrypted password encrypted by the second encryption method to the connection server 11 specified by the network address contained in the received connection command. Thereby, a user of the client cannot know the network address of the connection server until the authentication server authenticates. As a result, security can be improved.

In this embodiment, the connection server 11 transmits a message indicating the transition to the connection wait state to the authentication server 4. However, the message transmission is not necessarily required. If the message is not transmitted, the authentication server 4 transmits the client address to the connection server 11 and transmits the connection command to the client 3 (S31).

The connection server 11 checks whether or not the encrypted user name and password match the registered user name and password (S51). If they match, pptp communications are started (S52). If they do not match at step S51, the authentication processing is interrupted. The encryption by the second encryption method need not necessarily be able to undergo decryption; for example, the hash value of the user name and the hash value of the password may be used (namely, the second encryption method may be the same as the first encryption method) or predetermined information (information generated whenever a connection request is made, such as unique information, or challenge information acquired from the connection server 11 (information containing a random value generated whenever a connection request is made)) may be encrypted with the user name and password as keys.

If the user name is encrypted as a MD5 hash value, the connection server 11 compares the hash value with the hash value of the user name, registered thereby checking whether or not they match for authenticating the user name. If the unique information is encrypted with the user name as a key, the connection server 11 uses the registered user name and unique information for encrypting to generate second encrypted user name and checks whether or not the generated information matches the received information for authenticating the user name.

Further, to use challenge information, the connection server 11 issues challenge information containing random information, delivers the issued challenge information to the client 3, receives challenge information encrypted with the user name as a key, uses the registered user name and the issued challenge information for encrypting to generate second encrypted user name and checks whether or not the generated information matches the received information for authenticating the user name.

[Connection Processing]

Since authentication is thus conducted, even if the encrypted user name and password are leaked at a midway point, it is difficult to know the original user name and therefore the dedicated application software cannot be operated. In order to open the port of the connection server 11, it is indispensable to perform an attack against the authentication server 4 thereby decreasing the frequency of attacks against the connection server 11. Since the basic authentication is first conducted in the authentication server 4, the processing load on the connection server 11 is reduced. Further, even if the port is opened and it is made possible to perform hacking by transmitting a large amount of passwords, it is virtually impossible to make illegal access because the user name and the password need to be found out within 60 seconds during which the port is open. Further, when the connection processing is complete, the port used for the connection may be closed. If authentication based on a password ends in failure as many times as the predetermined number of times (for example, which may be set to once) with the port of the connection server 11 open, the port may be closed.

Further, one of the features of the embodiment is that the user can be identified by the encrypted user name although the use name and the password are encrypted using information generated each time a connection request is made. Therefore, in the local network, processing corresponding to each user is made possible in such a manner that the access right is set for each user.

The connection server 11 may generate user record of the last access date and time for each user and store the record in the storage section 16. In this case, whenever the user accesses the connection server 11, the connection server 11 searches the storage section 16 for the information indicating the previous access date and time of the user and provides the user with the information. Accordingly, if illegal access is made, the user can recognize the fact and the security is more enhanced.

Since the user can be thus identified, preferably the expiration date is set for each user. Specifically, the connection server 11 retains the expiration date information in association with each user and references the expiration date information of the user authenticated at step S51 and calendar information (not shown) to check whether or not the expiration date is reached before pptp communications are started. If the expiration date is reached, the connection server 11 interrupts the authentication processing and refuses connection; if the expiration date is not reached, the connection server 11 goes to step S52 for starting pptp communications. The administrator of the connection server 11 may be allowed to update and register the expiration date information.

In the description made so far, the client 3 transmits a connection request together with the first encrypted user name and the first encrypted password at steps S5 to S7. However, as for the password, authentication using a challenge response maybe conducted in such a manner that first the client 3 transmits a connection request together with the first encrypted user name, receives challenge information (containing random information) issued by the authentication server 4 receiving the connection request, encrypts the challenge information with the first encrypted password as a key, and transmits the encrypted challenge information.

This is also applied between the client 3 and the connection server 11. In the description made so far, the client 3 generates the second encrypted user name and the second encrypted password encrypted by the second encryption method and transmits them to the connection server 11. However, as for the password, authentication using the challenge response installed in some pptp may be conducted without encrypting the password by the second encryption method.

The network address of the first communication control section 17 of the connection server 11 may be fixedly set or may be changed with time. That is, if the network address mentioned here is an IP address, it may be static or may be dynamic. When the network address assigned to the first communication control section 17 of the connection server 11 is changed, the connection server 11 transmits a new network address to the authentication server 4 for updating the registered network address to the new one.

Furthermore, herein described is the case where pptp is used as a communication protocol in RAS connection with the client 3. However, the invention is not limited thereto. Other secure communication protocol such as IPSEC or VPN-HTTPS may be used.

FIG. 1
1 LOCAL NETWORK
2 PUBLIC NETWORK
15 CONTROL SECTION
16 STORAGE SECTION
17 FIRST COMMUNICATION CONTROL SECTION
18 SECOND COMMUNICATION CONTROL SECTION
31 CONTROL SECTION
32 STORAGE SECTION
33 COMMUNICATION CONTROL SECTION
34 DISPLAY SECTION
35 OPERATION SECTION
41 CONTROL SECTION
42 STORAGE SECTION
43 COMMUNICATION CONTROL SECTION

FIG. 3
S1 PROMPT USER TO ENTER USER NAME AND PASSWORD
S2 ACCEPT ENTRY OF USER NAME AND PASSWORD
S3 GENERATE UNIQUE INFORMATION
S4 DO ENCRYPTION RESULTS OF FIRST, SECOND INFORMATION MATCH? INTERRUPT PROCESSING
S5 ENCRYPT USER NAME AND PASSWORD BY FIRST ENCRYPTION METHOD
S6 DECRYPT NETWORK ADDRESS OF AUTHENTICATION SERVER
S11 SEARCH FOR USER NAME AND PASSWORD
S12 ACQUIRE NETWORK ADDRESS OF CONNECTION SERVER
S13 ACQUIRE NETWORK ADDRESS OF CLIENT
S14 TRANSMIT NETWORK ADDRESS OF CLIENT
S15 WAIT

FIG. 4
S21 ALLOW ACCESS FROM CLIENT TO BE ACCEPTED FOR GIVEN TIME
S22 TRANSMIT MESSAGE INDICATING TRANSITION TO CONNECTION WAIT STATE
S31 TRANSMIT CONNECTION COMMAND
S41 ENCRYPT USER NAME AND PASSWORD BY SECOND ENCRYPTION METHOD
S42 TRANSMIT SECOND ENCRYPTED USER NAME AND SECOND ENCRYPTED PAS SWORD
S51 DOES ENCRYPTED INFORMATION MATCH REGISTERED INFORMATION? INTERRUPT PROCESSING
S52 START pptp COMMUNICATIONS

What is claimed is:

1. A network connection system comprising:
a client machine;
an authentication server machine; and
a connection server machine; wherein:
the authentication server machine includes:
a retention unit configured to store second connection authentication information generated by the connection server machine based on user identification information and to store an association between the second connection authentication information and a connection server address of the connection server machine;
a first unit configured to acquire, from the client machine, second connection authentication information that is generated by the client machine based on user identification information input into the client machine and to acquire a client address of the client machine once the first unit receives a connection request from the client machine; and
a second unit configured to transmit the client address to the connection server address associated with the second connection authentication information acquired by the first unit and to transmit the connection server address to the client machine, the authentication server machine transmitting the connection server address to the client machine in an authentication process before having ever received the connection server address from the client machine in the same authentication process;
the client machine includes:
a third unit configured to transmit in a message the second connection authentication information generated by the client machine to the authentication server machine together with the connection request, the message lacking the address of the connection server machine;
a fourth unit configured to receive the connection server address from the authentication server machine; and
a fifth unit configured to prepare first connection authentication information based on the user identification information input into the client machine and to transmit the first connection authentication information to the connection server address of the connection server machine;
the connection server machine includes:
a sixth unit configured to allow the first connection authentication information to be received from the client machine, the client address being received from the authentication server machine; and
a seventh unit configured to perform itself an authentication process by using the first connection authentication information transmitted from the client address, and
the authentication server machine, in response to receiving the second connection authentication information from the client machine, searches the retention unit for the second connection authentication information to determine the connection server address associated with the second connection authentication information.

2. The network connection system according to claim 1, wherein the second connection authentication information is a message digest of the first connection authentication information.

3. The network connection system according to claim 1, wherein the sixth unit of the connection server machine allows the first connection authentication information to be received from the client address for a limited time period.

4. An authentication server machine connected to a plurality of client machines and a plurality of connection server machines, the authentication server machine comprising:
a retention unit configured to store second connection authentication information generated based on user identification information and to store an association between each second connection authentication information and a connection server address of a corresponding connection server machine;
a first unit configured to acquire the second connection authentication information from a client machine and a client address once the first unit receives a connection request from the client machine; and
a second unit configured to transmit the acquired client address to the connection server address of the connection server machine associated with the acquired second connection authentication information, and to transmit the connection server address to the client machine which has transmitted the connection request, wherein the authentication server machine, in response to receiving the second connection authentication information from the client machine, searches the retention unit for the second connection authentication information to determine the connection server address associated with the second connection authentication information, and the authentication server machine transmits the connection server address to the client machine in an authentication process before having ever received the connection server address from the client machine in the same authentication process.

5. A network connection system comprising:
a client machine;
an authentication server machine; and
a connection server machine, wherein:
the authentication server machine includes:
   a retention unit configured to store a first encrypted user name and a first encrypted password, which are encrypted by a first encryption method, and to store an association between a connection server address of the connection server machine and the first encrypted user name and the first encrypted password;
   a first unit configured to acquire the first encrypted user name and the first encrypted password and a client address once the first unit receives a connection request from the client machine, the first encrypted user name and the first encrypted password being an identification information for identifying a user of the client machine and
   a second unit configured to transmit the acquired client address to the connection server address associated with the user identification information, to receive from the connection server machine information indicating that the connection server machine has shifted to a connection wait state, and to transmit the connection server address to the client machine, the authentication server machine transmitting the connection server address to the client machine in an authentication process before having ever received the connection server address from the client machine in the same authentication process;
the client machine includes:
   a third unit configured to transmit to the authentication server machine in a message the first encrypted user name and the first encrypted password, which are encrypted by the first encryption method, together with the connection request, the message lacking the address of the connection server machine;
   a fourth unit configured to receive the connection server address from the authentication server machine, and to transmit to the connection server address a second encrypted user name and a second encrypted password, which are generated by encrypting using a second encryption method a user name and a password input by the user, and
the authentication server machine, in response to receiving the first encrypted user name and the first encrypted password from the client machine, searches the retention unit for the first encrypted user name and the first encrypted password to determine the connection server address associated with the first encrypted user name and the first encrypted password.

6. An authentication server machine operating with a plurality of client machines and a plurality of connection server machines, the authentication server machine comprising:
a retention unit configured to store user names and passwords, which are encrypted by a predetermined method, and to store associations between both of each user name and each password and a connection server address of a corresponding connection server machine;
a first unit configured to acquire an acquired encrypted user name, an acquired encrypted password, and an acquired client address once the first unit receives a connection request from the client machine, the encrypted user name and password being an identification information of a user of the client machine; and
a second unit configured to transmit the acquired client address to the connection server address associated with the acquired encrypted user name and password, to receive from the connection server machine information indicating that the connection server machine has shifted from a state in which authentication information is not allowed to be received from the client address to a state in which authentication information is allowed to be received from the client address, and to transmit the connection server address to the client machine, which has issued the connection request, wherein
the authentication server machine, in response to receiving the identification information of a user of the client machine from the client machine, searches the retention unit for the identification information of a user of the client machine to determine the connection server address associated with the identification information of a user of the client machine, and
the authentication server machine transmits the connection server address to the client machine in an authentication process before having ever received the connection server address from the client machine in a same authentication process.

7. A connection method using a network connection system including a client apparatus, an authentication server, and a connection server, the method comprising:
storing in the authentication server second connection authentication information generated by the connection server based on first connection authentication information;
associating the second connection authentication information with a connection server address of the connection server;
transmitting in a message by the client apparatus to the authentication server a second connection authentication information generated by the client apparatus as user identification information together with a connection request, the message lacking an address of the connection server;
acquiring a client address and the user identifying information from the client apparatus once the authentication server receives the connection request from the client apparatus;
transmitting the client address to the connection server address of the connection server once the user identification information is authenticated based on the second connection authentication information;
transmitting, by the authentication server, the connection server address to the client apparatus, the authentication server transmitting the connection server address to the client apparatus in an authentication process before having ever received the connection server address from the client apparatus in the same authentication process;
receiving by the client apparatus the connection server address from the authentication server;
transmitting by the client apparatus a first connection authentication information to the connection server address;

receiving by the connection server the first connection authentication information from the client address; and performing an authentication process by using the first connection authentication information transmitted from the client address.

8. The connection method according to claim 7, further comprising:

allowing the connection server to receive the first connection authentication information from the client address for a limited time period.

9. A connection method using a network connection system including a client apparatus, an authentication server, and a connection server, the method comprising:

storing by the authentication server a user name and a password which are encrypted by a first encryption method;

storing in a retention unit in the authentication server an association between both the encrypted user name and the encrypted password and a connection server address of the connection server;

transmitting in a message by the client apparatus to the authentication server a connection request and the user name and the password which are encrypted by the first encryption method, the message lacking an address of the connection server;

receiving by the authentication server the connection request from the client apparatus;

acquiring a client address of the client apparatus and the user name and the password, which are encrypted by the first encryption method, as information identifying a user of the client apparatus;

searching, by the authentication server, in response to receiving the information identifying the user of the client apparatus from the client apparatus, the retention unit for the information identifying the user of the client apparatus to determine the connection server address associated with the information identifying the user of the client apparatus;

transmitting, by the authentication server, the connection server address to the client apparatus in an authentication process before having ever received the connection server address from the client apparatus in the same authentication process;

transmitting the client address to the connection server address;

receiving by the connection server the client address;

switching, by the connection server, from a state in which authentication information is not allowed to be received from the client address to a state in which authentication information is allowed to be received from the client address, the switching occurring in response to the receiving of the client address;

transmitting to the authentication server information indicating that the connection server has shifted to a connection wait state in which the connection server allows communication from the address of the client apparatus for a predetermined period;

encrypting using a second encryption method a user name and a password input by a user;

transmitting to the connection server address the user name and the password which are encrypted by the second encryption method; and performing, by the connection server, an authentication process by using the user name and the password which are encrypted by the second encryption method and are received by the connection server from the client apparatus.

10. The connection method according to claim 9, further comprising:

after a limited time period has elapsed since the connection server performs the switching, switching back from the state in which authentication information is allowed to be received from the client address to the state in which authentication information is not allowed to be received from the client address.

11. A computer readable storage medium storing a program causing a computer of a client apparatus to execute an access processing to a network system including an authentication server and a connection server, wherein, the authentication server includes (i) a first unit that acquires, from the connection server, an address of the connection server and user identification information encrypted by the connection server with a first encryption method and (ii) a first retention unit that stores the address of the connection server and the encrypted user identification information which are acquired by the first unit, the connection server includes a second retention unit that stores unique information which is unique to the client apparatus and the user identification information, the client apparatus includes a third retention unit that stores an address of the authentication server, first information and second information, wherein the first information is generated by the connection server by encrypting predetermined information with the unique information as a key and the second information is generated by the connection server by encrypting predetermined information with the user identification information as a key, the access processing comprising:

requesting a user to enter user identification information, receiving user identification information from the user, generating unique information which is unique to the client apparatus in response to receiving the user identification information, decrypting the first information stored in the third retention unit by using the generated unique information as a key, decrypting the second information stored in the third retention unit by using the received user identification information as a key, judging whether the decrypted first and second information are correct, encrypting the received user identification information with the first encryption method if the decrypted first and second information is correct, transmitting in a message, to the authentication server, an access request and the received used identification information encrypted with the first encryption method, the message lacking the address of the connection server, and receiving from the authentication server the address of the connection server before having ever transmitted the connection server address to the authentication server in the same access processing.

* * * * *